United States Patent
Hamada

(10) Patent No.: US 9,148,638 B2
(45) Date of Patent: Sep. 29, 2015

(54) DIGITAL PHOTOGRAPHING APPARATUS

(71) Applicant: SAMSUNG ELECTRONICS CO., LTD., Suwon-si, Gyeonggi-do (KR)

(72) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 13/670,091

(22) Filed: Nov. 6, 2012

(65) Prior Publication Data

US 2013/0113957 A1 May 9, 2013

(30) Foreign Application Priority Data

Nov. 7, 2011 (KR) .................. 10-2011-0115360

(51) Int. Cl.
*H04N 9/73* (2006.01)
*H04N 5/235* (2006.01)

(52) U.S. Cl.
CPC ............ *H04N 9/735* (2013.01); *H04N 5/2351* (2013.01)

(58) Field of Classification Search
CPC ............................. H04N 5/243; H04N 9/735
See application file for complete search history.

(56) References Cited

U.S. PATENT DOCUMENTS

| | | | | |
|---|---|---|---|---|
| 2005/0141002 A1* | 6/2005 | Takano et al. | ............. | 358/1.9 |
| 2006/0044459 A1* | 3/2006 | Kato | ............. | 348/362 |
| 2007/0115372 A1* | 5/2007 | Wu et al. | ............. | 348/230.1 |
| 2008/0180544 A1* | 7/2008 | Drader et al. | ............. | 348/223.1 |
| 2009/0244329 A1* | 10/2009 | Kuniba | ............. | 348/241 |
| 2011/0249140 A1* | 10/2011 | Fujiwara et al. | ............. | 348/223.1 |
| 2011/0285745 A1* | 11/2011 | Zhang et al. | ............. | 345/593 |
| 2012/0114238 A1* | 5/2012 | Park | ............. | 382/169 |
| 2013/0162880 A1* | 6/2013 | Yun et al. | ............. | 348/333.11 |

FOREIGN PATENT DOCUMENTS

| | | | | |
|---|---|---|---|---|
| JP | 06-070206 A | 3/1994 | | |
| JP | 2001-177758 A | 6/2001 | | |
| JP | 2001177758 A | * 6/2001 | ............. | H04N 5/235 |
| JP | 2004-205885 A | 7/2004 | | |

OTHER PUBLICATIONS

Title: Translation of JP2001-177758A Author: Sanno Masahito Date: Jun. 2001.*

* cited by examiner

*Primary Examiner* — Twyler Haskins
*Assistant Examiner* — Wesley J Chiu
(74) *Attorney, Agent, or Firm* — Drinker Biddle & Reath LLP

(57) ABSTRACT

A digital photographing apparatus including: a display unit for displaying a captured image; a position setting unit for setting a position on the display unit; an area setting unit for setting an area based on the position set by the position setting unit; a photometry unit for measuring luminance of the set area; an exposure value determination unit for determining an exposure value based on a photometric reference and a result of the measuring performed by the photometry unit. The digital photographing apparatus may capture a high quality image by properly adjusting exposure and white balance.

19 Claims, 13 Drawing Sheets

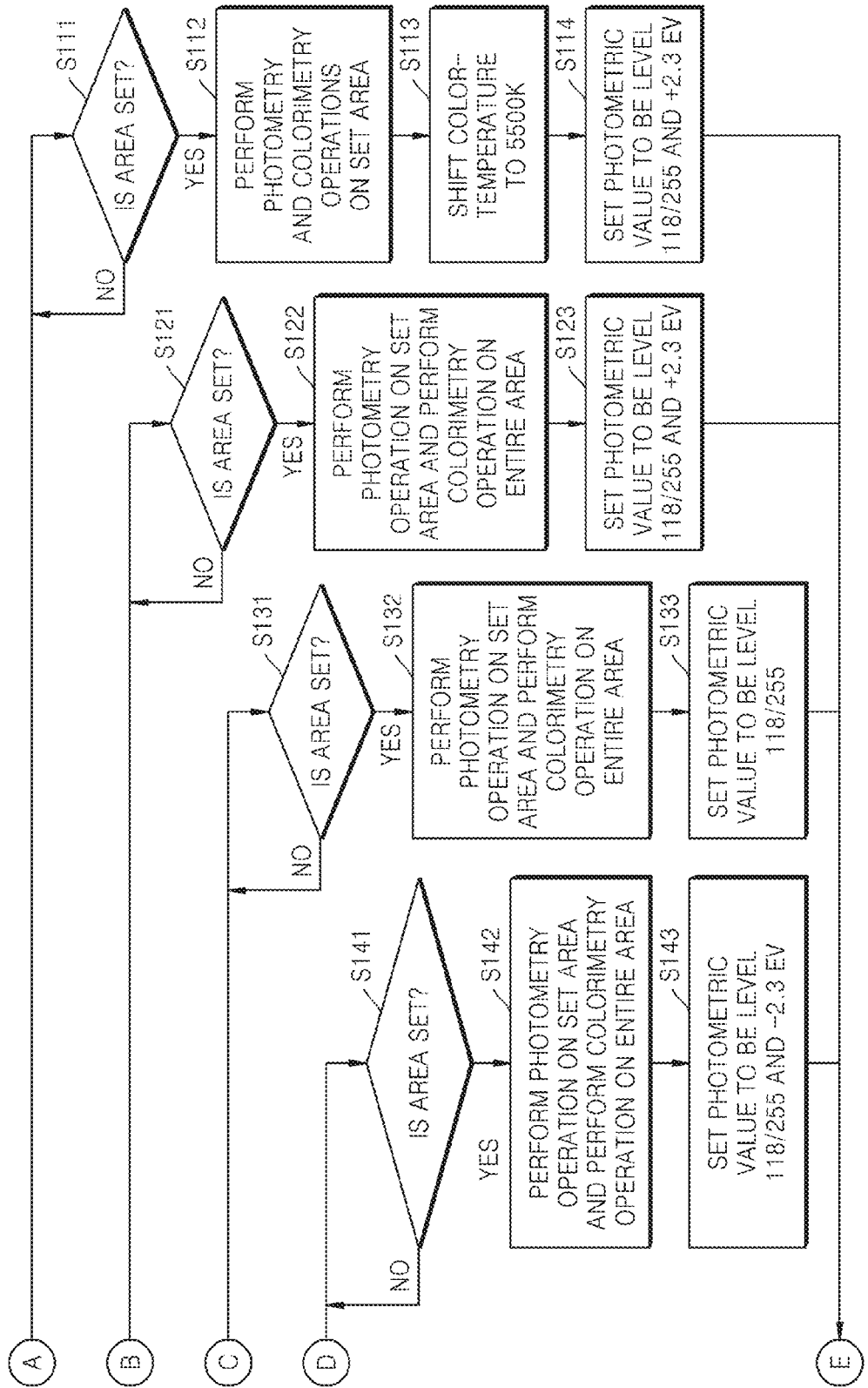

DIGITAL PHOTOGRAPHING APPARATUS

CROSS-REFERENCE TO RELATED PATENT APPLICATION

This application claims the benefit of Korean Patent Application No. 10-2011-0115360, filed on Nov. 7, 2011, in the Korean Intellectual Property Office, the disclosure of which is incorporated herein in its entirety by reference.

BACKGROUND

The various embodiments of the invention relate to a digital photographing apparatus.

When digital photographing apparatuses, such as digital cameras or camcorders, are used to photograph a subject, colors and luminance of a captured image may be different from those of the subject that is actually recognized by human eyes because an exposure value or a white balance gain may not be properly set. Accordingly, digital photographing apparatuses are required to have functions of adjusting an exposure value and white balance.

SUMMARY

The various embodiments of the invention provide a digital photographing apparatus capable of properly adjusting exposure and white balance.

According to an embodiment, there is provided a digital photographing apparatus including: a display unit for displaying a captured image; a position setting unit for setting a position on the display unit; an area setting unit for setting an area based on the position set by the position setting unit; a photometry unit for measuring luminance of the set area; an exposure value determination unit for determining an exposure value based on a photometric reference and a result of the measuring performed by the photometry unit; a colorimetric unit for measuring a color of the set area; and a color-temperature adjusting unit for adjusting a color-temperature of an image based on a colorimetric reference and a result of the measuring performed by the colorimetric unit.

The photometric reference may be a first photometric reference that allows a value obtained as a result of measuring the luminance of the set area to be a reference value of a high luminance area of luminance distribution according to an exposure amount of an image.

When a reference reflectivity is 18%, which is an average reflectivity of a general object, and when luminance of the average reflectivity is set to be in a range of about 115/255 to about 128/255, which is a range of luminance according to the luminance distribution, the reference value may be set to be in a range of about 190/255 to about 255/255 of the luminance distribution.

The photometric reference may be a second photometric reference that allows a value obtained as a result of measuring the luminance of the set area to be a reference value of average luminance corresponding to a center of luminance distribution according to an exposure amount of an image.

When a reference reflectivity is 18%, which is an average reflectivity of a general object, the reference value may be set to be in a range of about 115/255 to about 128/255 of the luminance distribution.

The photometric reference may be a third photometric reference that allows a value obtained as a result of measuring the luminance of the set area to be a reference value of a low luminance area of luminance distribution according to an exposure amount of an image.

When a reference reflectivity is 18%, which is an average reflectivity of a general object, and when luminance of the average reflectivity is set to be in a range of about 115/255 to about 128/255, which is a range of luminance according to the luminance distribution, the reference value may be set to be in a range of about 0/255 to about 50/255 of the luminance distribution.

The colorimetric reference may be a first colorimetric reference that allows a color-temperature of the set area to be a white reference value in daylight.

The color-temperature of the white reference value in daylight may be set to be in a range of about 5000K to about 6500K.

The colorimetric reference may be a second colorimetric reference that allows a color-temperature of the set area to be a gray reference value that is set based on the white reference value in daylight.

The color-temperature of the white reference value in daylight may be set to be in a range of about 5000K to about 6500K.

According to another embodiment, there is provided a digital photographing apparatus including: a display unit for displaying a captured image; a position setting unit for setting a position on the display unit; an area setting unit for setting an area based on the position set by the position setting unit; a photometry unit for measuring luminance of the set area; an exposure value determination unit for determining an exposure value based on a photometric reference and a result of the measuring performed by the photometry unit, wherein a plurality of positions may be set, the area setting unit sets a plurality of areas based on the set positions, and the exposure value determination unit performs a photometry operation from results of measurement with respect to the plurality of areas and determines the exposure value based on a value obtained as a result of the photometry operation and the photometric reference.

The photometry operation may be a calculation for extracting a maximum value from the results of measurement, and the photometric reference may be a first photometric reference that allows the value obtained as a result of the photometry operation to be a reference value of a high luminance area of luminance distribution according to an exposure amount of an image.

The photometry operation may be an operation for extracting an average value of the results of measurement, and the photometric reference may be a second photometric reference that allows the value obtained as a result of the photometry operation to be a reference value of average luminance corresponding to a center of luminance distribution according to an exposure amount of an image.

The photometry operation may be an operation for extracting a minimum value from the results of measurement, and the photometric reference may be a third photometric reference that allows the value obtained as a result of the photometry operation to be a reference value of a low luminance area of luminance distribution according to an exposure amount of an image.

In at least one area of the set areas, a first photometric value, which is a reference value of a high luminance area of luminance distribution according to an exposure amount of an image, may be obtained as a result of the photometry operation; and in another area, a third photometric value, which is a reference value of a low luminance area of the of luminance distribution, may be obtained as a result of the photometry operation, and wherein the photometry operation may be a calculation for setting an average value between the first photometric value and the third photometric value as an average colorimetric reference value.

The position setting unit may be a touch panel or a position setting manipulation key.

According to another embodiment, there is provided a digital photographing apparatus including: a display unit for displaying a captured image; a position setting unit for setting a position on the display unit; an area setting unit for setting an area based on the position set by the position setting unit; a photometry unit for measuring luminance of the set area; an exposure value determination unit for determining an exposure value based on a photometric reference and a result of the measuring performed by the photometry unit; a colorimetric unit for measuring a color of the set area; and a color-temperature adjusting unit for adjusting a color-temperature of an image based on a colorimetric reference and a result of the measuring performed by the colorimetric unit, wherein a plurality of positions may be set, the area setting unit sets a plurality of areas based on the set positions, and the exposure value determination unit performs a photometry operation from results of measurement with respect to the plurality of areas and determines the exposure value based on a value obtained as a result of the photometry operation and the photometric reference.

According to another embodiment, there is provided a digital photographing apparatus including: A digital photographing apparatus comprising: a display unit for displaying a captured image; a position setting unit for setting a position on the display unit; an area setting unit for setting an area based on the position set by the position setting unit; a photometry unit for measuring luminance of the set area; an exposure value determination unit for changing a photometric reference of the set area and determining an exposure value based on the changed photometric reference.

BRIEF DESCRIPTION OF THE DRAWINGS

The above and other features and advantages of the invention will become more apparent by describing in detail exemplary embodiments thereof with reference to the attached drawings in which:

FIGS. 15A and 15B are flowcharts showing a method of controlling a digital photographing apparatus, according to an embodiment of the invention;

DETAILED DESCRIPTION

Figure 1:
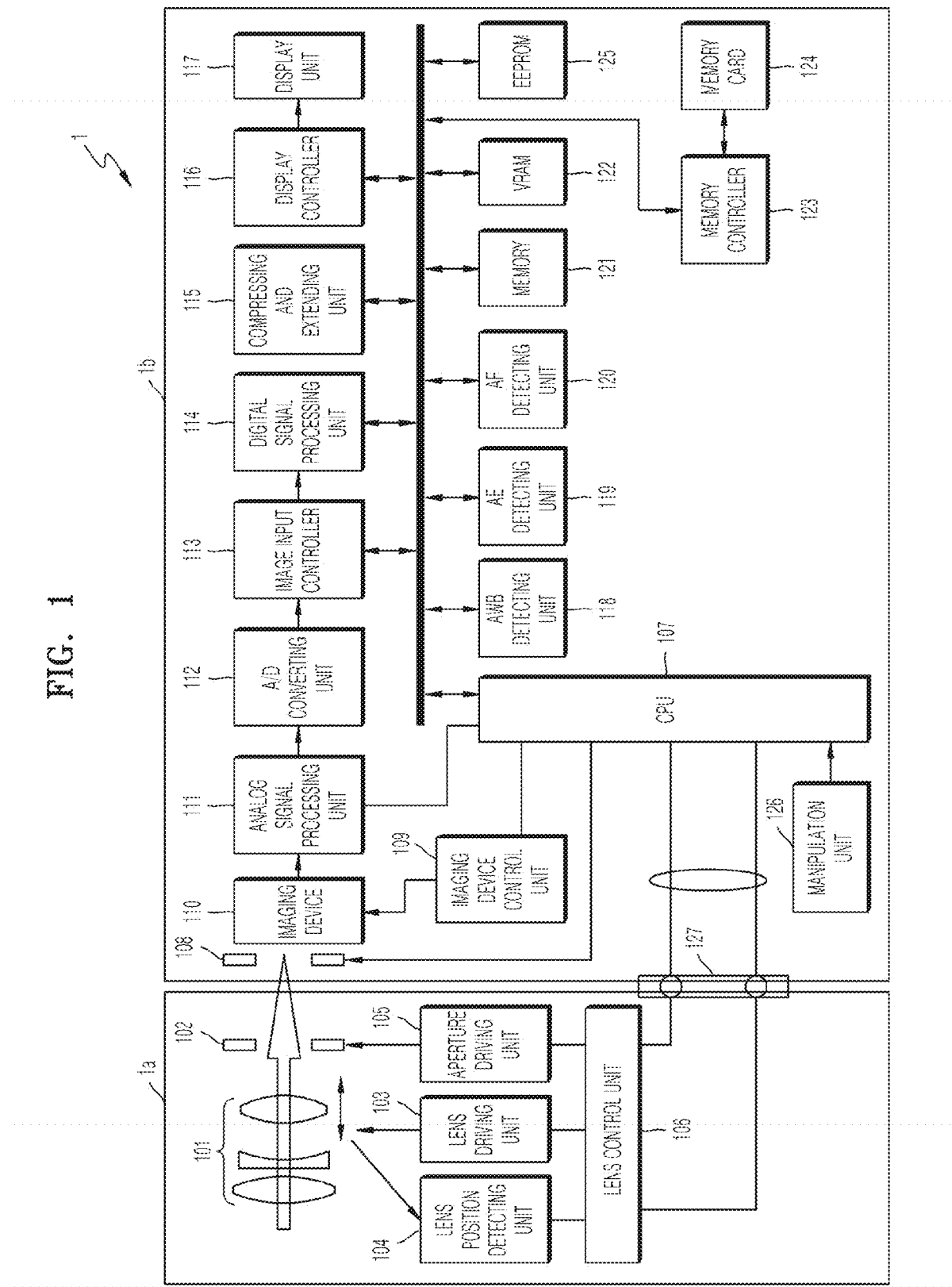
FIG. 1 is a block diagram showing a configuration of a digital photographing apparatus, according to an embodiment of the invention.

Various changes in form and details may be made to the invention and thus should not be construed as being limited to the embodiments set forth herein. The invention is not limited to the embodiments described in the present description, and thus it should be understood that the embodiments do not include every kind of variation example or alternative equivalent included in the spirit and scope of the invention. Also, while describing the embodiments, detailed descriptions about related well-known functions or configurations that may diminish the clarity of the points of the embodiments of the invention will be omitted.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Hereinafter, the invention will be described in detail by explaining exemplary embodiments of the invention with reference to the attached drawings. Like reference numerals in the drawings denote like elements, and thus their description will be omitted.

FIG. 1 is a block diagram showing a configuration of a digital photographing apparatus 1, according to an embodiment of the invention. The digital photographing apparatus 1 of FIG. 1 includes a body and a lens that are detachably installed therein.

Referring to FIG. 1, the digital photographing apparatus 1 includes a lens unit 1a and a body 1b. In the current embodiment, the lens unit 1a is formed in the body 1b to be detachable via a lens mount 127.

The lens unit 1a includes an imaging lens 101, an aperture 102, a lens driving unit 103, a lens position detecting unit 104, an aperture driving unit 105, and a lens control unit 106.

The imaging lens 101 includes a zoom lens, a focus lens, and the like and may perform focus adjustment by driving of the focus lens.

The aperture 102 adjusts an opening extent according to an aperture value determined by an exposure value that is previously set.

The lens driving unit 103 drives the focus lens under the control of the lens control unit 106. The lens position detecting unit 104 detects a position of the focus lens and transmits a result of the detection to the lens control unit 106.

The aperture driving unit 105 drives the aperture 102 under the control of the lens control unit 106.

The lens control unit 106 controls operations of the lens driving unit 103 and the aperture driving unit 105 and receives position information from the lens position detecting unit 104. The lens control unit 106 communicates with a central processing unit (CPU) 107 to exchange information regarding focus detection, an exposure value, an aperture value, and the like with the CPU 107.

The body 1b includes the CPU 107, a shutter 108, an imaging device control unit 109, an imaging device 110, an analog signal processing unit 111, an analog/digital (A/D) converting unit 112, an image input controller 113, a digital signal processing unit 114, a compressing and extending unit 115, a display controller 116, a display unit 117, an auto white balance (AWB) detecting unit 118, an auto-exposure (AE) detecting unit 119, an auto-focus (AF) detecting unit 120, a memory 121, a video random access memory (VRAM) 122, a media controller 123, a memory card 124, an electrically erasable programmable read-only memory (EEPROM) 125, and a manipulation unit 126.

The CPU 107 controls the whole operation of the digital photographing apparatus 1.

The shutter 108 determines a time period during which light is emitted onto the imaging device 110 when capturing an image, that is, an exposure time, under the control of the CPU 107.

The imaging device control unit 109 generates a timing signal and applies the timing signal to the imaging device 110, and thus the imaging device control unit 109 controls an imaging operation of the imaging device 110. Also, if accumulation of charges is finished in each scan line of the imaging device 110, the imaging device control unit 109 controls the imaging device 110 to sequentially read image signals.

The imaging device 110 captures image light of a subject that has passed through the imaging lens 101 to generate the image signals. The imaging device 110 may include a plurality of photoelectric conversion devices arranged in a matrix array, a charge transmission line for moving charges from the photoelectric conversion devices, and the like.

The analog signal processing unit 111 removes noise from the image signals read by the imaging device 110 or amplifies magnitudes of the image signals to a predetermined level. The A/D converting unit 112 converts an analog image signal that is output from the analog signal processing unit 111 into a digital image signal. Also, the image input controller 113 processes the image signals output from the A/D converting unit 112 so as to be image-processed in each subsequent component.

The image signals output from the image input controller 113 undergo AWB processing, AE processing, and AF processing in an AWB detecting unit 118, an AE detecting unit 119, and an AF detecting unit 120, respectively.

The AWB detecting unit 118 measures a color of an image. The AWB detecting unit 118 adjusts a white balance gain based on a result of the measurement of the AWB detecting unit 118 and a colorimetric reference, and thus adjusts a color-temperature of an input image. In other words, the AWB detecting unit 118 may be an example of a colorimetric unit and a color-temperature adjusting unit.

The AE detecting unit 119 may measure luminance of the input image. The AE detecting unit 119 may also determine an exposure value according to a result of the measurement and a colorimetric reference that is set by a user. That is, the AE detecting unit 119 may be an example of a photometry unit and an exposure value adjusting unit.

The image signal that is output from the image input controller 113 may be temporarily stored in the memory 121 such as a synchronous dynamic random access memory (SDRAM).

The digital signal processing unit 114 performs a series of image signal processing operations, such as gamma correction, on the image signal output from the image input controller 113 to generate a live-view image or a capture image that may be displayed on the display unit 117. The digital signal processing unit 114 may also perform white balance adjustment on a captured image according to the white balance gain that is detected by the AWB detecting unit 118.

The compressing and extending unit 115 compresses and extends the image signal on which the image signal processing has been performed. The image signal is compressed in a compression format, for example, a joint photographic experts group (JPEG) compression format or a H.264 compression format. An image file including image data generated by the compression processing is transmitted to the memory controller 123 that stores the image file in the memory card 124.

The display controller 116 controls images output to the display unit 117. The display unit 117 displays various images, such as a captured image or a live-view image, various setting information, or a user interface (UI). The display unit 117 and the display controller 116 may be configured as a liquid crystal display (LCD) and a LCD driver, respectively. However, the invention is not limited thereto, and the display unit 117 and the display controller 116 may be an organic electroluminescent (EL) display and a driving unit thereof, respectively.

The display unit 117 includes a touch panel and may receive a user's input. In this case, the user may perform positioning setting through the touch panel. That is, the display unit 117 may be an example of a position setting unit.

The VRAM 122 may temporarily store information about an image to be displayed on the display unit 117, and the EEPROM 125 may store an executable program for controlling the digital photographing apparatus 1 or various pieces of management information.

The manipulation unit 126 is a unit for inputting various commands from a user to manipulate the digital photographing apparatus 1. The manipulation unit 126 may include various buttons such as a shutter release button, a main switch, a mode dial, a menu button, a direction button, and the like.

Also, the manipulation unit 126 of the current embodiment may include a position setting manipulation key that serves as a position setting unit. For example, a direction button, a joystick, or the like may be used as the position setting manipulation key.

Meanwhile, in the digital photographing apparatus 1 of the current embodiment, a user may set a photometric reference or a colorimetric reference by using the touch panel of the display unit 117 or the buttons of the manipulation unit 126 in a spot AE mode or a spot AWB mode. A command to select the photometric reference or the colorimetric reference may be transmitted to the CPU 107.

Also, a user may perform positioning setting by using the touch panel or the position setting manipulation key. If a command to set a position is input by the user, information about the position that is set is transmitted to the CPU 107. The CPU 107 may set an area where photometry and colorimetry operations are to be performed based on the input position information. That is, the CPU 107 may be an example of an area setting unit.

Hereinafter, a method of performing the photometry and colorimetry operations by the digital photographing apparatus 1 will be described in detail. The method will be described assuming that the touch panel is used as the position setting unit.

Figure 2:
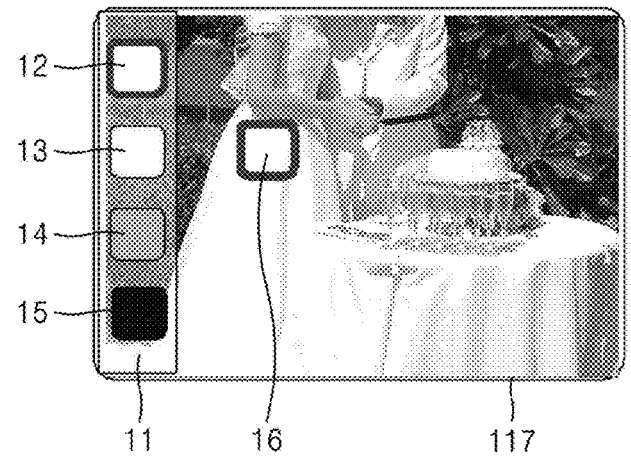
FIG. 2 is an image showing a method of controlling a digital photographing apparatus, according to an embodiment of the invention.
Figure 3:
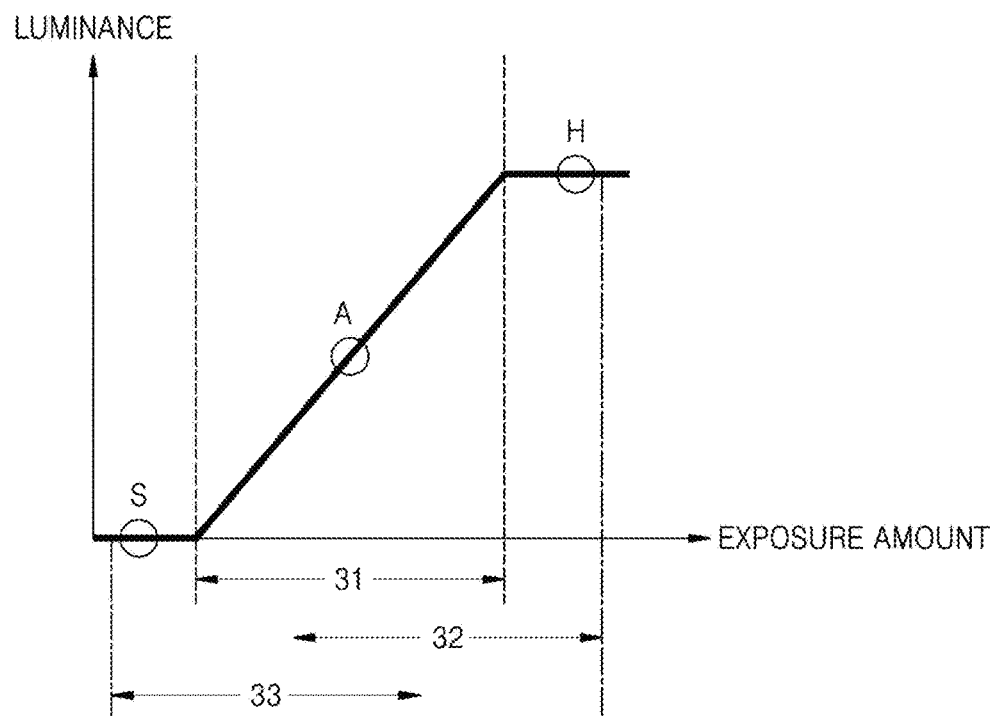
FIG. 3 is a graph showing luminance distribution of an image, according to an embodiment of the invention.

FIG. 2 is an image showing a method of controlling the digital photographing apparatus 1, according to an embodiment of the invention. FIG. 3 is a graph showing luminance distribution of an image, according to an embodiment of the invention.

Referring to FIG. 2, if the spot AE mode and the spot AWB mode are set by a user, a reference setting UI 11 for displaying various photometric references and/or colorimetric references is displayed at one side of the display unit 117. At this time, a live-view image is displayed on the display unit 117.

The reference setting UI 11 includes four setting icons. The four setting icons are a white highlight reference spot photometric icon 12, a highlight reference spot photometric icon 13, an average reference spot photometric icon 14, and a shadow reference spot photometric icon 15.

In FIG. 2, the white highlight reference spot photometric icon 12 is touched by a user, and accordingly, a white highlight reference spot photometry is selected as the colorimetric reference. If the user selects the white highlight reference spot photometric icon 12, an edge of the white highlight reference spot photometric icon 12 may be represented by a bold line in order to represent that the white highlight reference spot photometric icon 12 is selected. In the current embodiment, a color of the bold line is red, but the invention is not limited thereto.

Next, the user touches a position to be set as a white highlight, that is, a position to be set to have the highest luminance and to be displayed as a white color, and an edge of a setting area 16 is represented by a bold line based on the touched position. In the current embodiment, a color of the bold line is red, but the invention is not limited thereto.

Then, a spot photometry operation is performed. That is, a photometry operation is performed on the setting area 16 that is determined based on a position set by the user, and a result of the photometry operation may be a reference value of a high luminance area in a luminance distribution of an image. Also, a colorimetry operation is performed on the setting area 16, and a color reference value is shifted to display the setting area 16 as a white color based on a result of the colorimetry operation, which will be described with reference to FIGS. 3 and 4.

Referring to FIG. 3, a horizontal axis represents an exposure amount during photographing, and a vertical axis represents luminance. In the current embodiment, luminance data of 8 bits is assigned, and thus the luminance of level 255 may be represented.

An average reflectivity of an object is 18%. Accordingly, in the related art, a photometry operation is performed in a manner to control an exposure value so that the average reflectivity is a central value. The central value may be different according to manufactures of a digital photographing apparatus, but may be set to be 118/255 or 128/255. However, the invention is not limited thereto, and if the central value is set to be in a range between about 115/255 and about 128/255, an image has high reproducibility.

FIG. 3 is a graph showing a case where a photometry operation is performed on an area having a luminance of "A" when an average reference spot photometry is set on the area. When the operation photometry is performed using the average reference spot photometry, a range of an exposure amount that can be represented by luminance is a range 31. When the exposure is performed in the range 31, luminance of an area may be between 0 and 255 and can be represented using 8 bits.

In the above-described system, to perform a photometry operation according to white highlight reference spot photometry is to designate in such a way that an area of an exposure amount that is overflowed in view of general average photometry being within a photometry range that can be represented using 8 bits, and the area of an exposure amount that is overflowed is a part represented by "H" in FIG. 3. In order to photograph the part "H" as a white color that is not overflowed, the exposure amount is set to be within an appropriate range. When an average reflectivity of a general object is 18%, a range of the exposure amount is set in such a way that the part "H" is in a range of about 75 to about 90%, which may be a difference in exposure step of from about 2 steps to about 2.5 steps. For example, in a case of a standard condition in daylight, which is sunlight on a shiny day, luminance of the white color is increased by 2.3 EV, and the setting area 16 is processed to have the same value as an object having reflectivity of 87%, wherein the EV denotes an exposure value. Thus, by the photometry operation according to the white highlight reference spot photometry, a level of luminance of the setting area 16 is set to be in a range of about 225 to about 255, which corresponds to a range "32". That is, the range of the exposure amount is shifted in such a way that luminance of a vertical axis is within a range of about 0 to about 255.

Meanwhile, when white highlight reference spot photometry is set as a colorimetric reference, white balance setting is also performed, which will be described with reference to FIG. 4.

Figure 4:
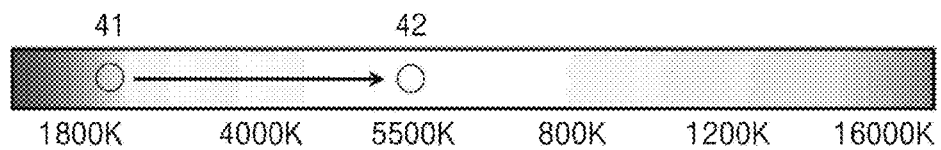
FIG. 4 is a view showing a color-temperature spectrum, according to an embodiment of the invention.
Figure 18:
FIGS. 18 and 19 are images showing colorimetric methods of a general digital photographing apparatus.
Figure 19:

FIG. 4 is a view showing a color-temperature spectrum, according to an embodiment of the invention. FIG. 4 is a graph in which a color-temperature according to black body radiation is represented in units of K. In FIG. 4, a left end is 1800K which represents a red color, and a right end is 16000K which represents a blue color. A color-temperature in daylight is in a range of about 5000K to about 6500K, and a standard of a white color used in the digital photographing apparatus 1 is 5500K in daylight. Accordingly, white balance is adjusted by shifting the setting area 16 in such a way that a color-temperature of the setting area 16 set by a user is 5500K, which is a standard of a white color in daylight, or is in a range of about 5000K to about 6500K. For example, if an image is captured under a sunset glow, the white color of the setting area 16 set by a user is represented by a red color as shown in FIG. 18, and a color-temperature thereof is 2000K. Accordingly, the white balance is adjusted in such a way the color-temperature of 2000K (41 in FIG. 4) is shifted to 5500K (42 in FIG. 4), and thus the setting area 16 is represented as a white color, thereby adjusting white balance of the entire capture image (FIG. 19).

Also, if a photometry operation is performed using general average photometry as if a photometry operation is performed in a conventional digital photographing apparatus, a white part is represented as a gray color. However, in the digital photographing apparatus 1 of the current embodiment, the white part may be represented as a white color as shown in FIG. 2.

FIGS. 5 to 8 are images showing methods of controlling the digital photographing apparatus 1, according to another embodiment of the invention.

Figure 5:
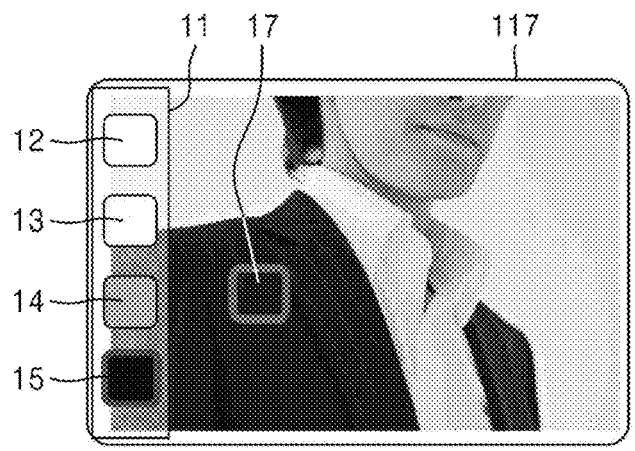
FIGS. 5 to 8 are images showing methods of controlling a digital photographing apparatus, according to another embodiment of the invention.

Referring to FIG. 5, the shadow reference spot photometric icon 15 is touched by a user, and thus shadow reference spot photometry is selected as a colorimetric reference. Similarly to FIG. 2, a border of the selected icon may be represented by a bold line.

Next, the user touches a portion to be set as a shadow, that is, as the lowest luminance, and a border of a setting area 17 is represented by a bold line based on the touched portion. In the current embodiment, the bold line is represented with a red color, but the invention is not limited thereto.

Then, shadow spot photometry is performed. That is, a photometry operation is performed on the setting area 17 that is determined based on a position set by a user, and a result of the photometry operation may be a reference value of a low luminance area in a luminance distribution of an image.

Referring back to FIG. 3, a setting point of the shadow spot photometry is a part "S". That is, in order for the part S to not be underflowed, an exposure amount is set to be within an appropriate range.

When an average reflectivity of a general object is 18%, a range of the exposure amount is set in such a way that the part "S" is in a range of about 0 to about 10%, which may be a difference in exposure step of from about 2 steps to about 3 steps. For example, in a case of a standard condition in daylight, luminance of a white color is decreased by 2.7 EV, and the setting area 17 is processed to have the same value as an object having reflectivity of 2.8%, wherein the EV denotes an exposure value. Thus, by the photometry operation according to the shadow reference spot photometry, the setting area 17 is set to have a level in a range of about 0 to about 10, which corresponds to a range "33". That is, the range of the exposure amount is shifted in such a way that luminance of a vertical axis is within a range of about 0 to about 255.

Figure 6:
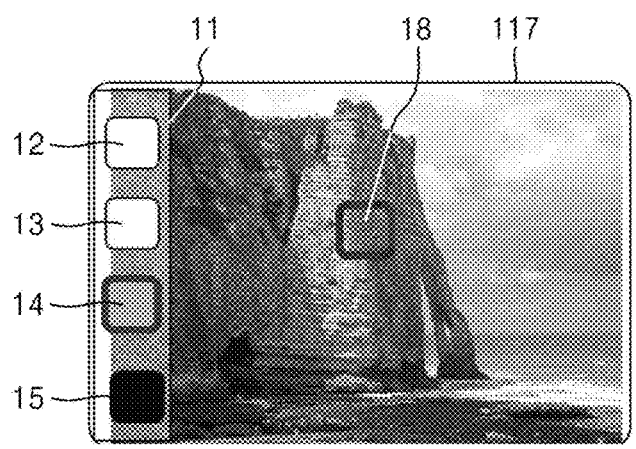

Referring to FIG. 6, the average reference spot photometric icon 14 is touched by a user, and thus average reference spot photometry is selected as a colorimetric reference. Similarly to FIG. 2, a border of the selected icon may be represented by a bold line.

Next, the user touches a portion to be set as an average luminance, and a border of a setting area 18 is represented by a bold line based on the touched portion. In the current embodiment, the bold line is represented with a red color, but the invention is not limited thereto.

Then, average reference spot photometry is performed. That is, a photometry operation is performed on the setting area 18 that is determined based on a position set by a user, and a result of the photometry operation may be a reference value of an average luminance corresponding to a center in a luminance distribution of an image.

As shown in FIG. 3, a setting point of the shadow spot photometry is the part "A". Then, a range of an exposure amount is set in such a way that the setting area 18 has a reflectivity of 18%, which is a reflectivity of a general object. That is, a level of luminance of the setting area 18 is set to be 118. Alternatively, the level of luminance of the setting area 18 may be set to be in a range of about 115 to about 128, which corresponds to a range "31". Luminance of a gray color of the setting area 18 is adjusted by the above-described controlling operation.

Figure 7:
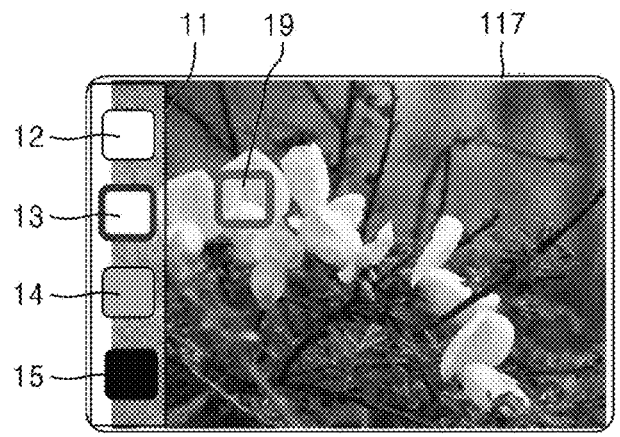

Referring to FIG. 7, the highlight reference spot photometric icon 13 is touched by a user, and thus highlight reference spot photometry is selected as a colorimetric reference. Similarly to FIG. 2, a border of the selected icon may be represented by a bold line.

Next, the user touches a portion to be set as a highlight, that is, as the highest luminance, and a border of a setting area 19 is represented by a bold line based on the touched portion. In the current embodiment, the bold line is represented with a red color, but the invention is not limited thereto.

Then, the highlight reference spot photometry is performed. That is, a photometry operation is performed on the setting area 19 that is determined based on a position set by a user, and a result of the photometry operation may be a reference value of a high luminance area in a luminance distribution of an image.

The highlight reference spot photometry is different from the white highlight reference spot photometry in that the highlight reference spot photometry does not have a white balance adjusting function. For example, in FIG. 7, a portion that is regarded as having the highest luminance is a flower petal represented with a yellow color. If the user performs the photometry operation using the highlight reference spot photometry, the yellow color is maintained and correction with respect to luminance is only performed.

The colors of the icons shown in FIGS. 2, and 5 to 7 are just examples that are determined for the user to intuitively recognize, and the invention is not limited thereto. For example, the highlight reference spot photometric icon 13 may be represented with a blue or green color, instead of a yellow color.

Figure 8:
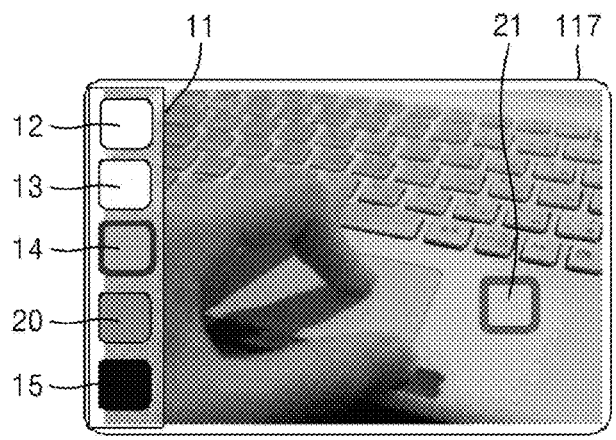

Referring to FIG. 8, the reference setting UI 11 includes five setting icons. That is, a gray average reference spot photometric icon 20 is added to the four setting icons according to the above-described embodiment. The gray average reference spot photometry is different from the average reference spot photometry according to the above-described embodiment in that a photometry operation according to the gray average reference spot photometry has a white balance adjusting function compared to the photometry operation according to the average reference spot photometry. In the gray average reference spot photometry, even if an image does not have a white portion, white balance adjustment may be performed using a gray portion.

Similarly to FIG. 2, a color-temperature of a setting area 21 is set to be 5500K. Here, a color of the setting area 21 is set to be a gray color which is an achromatic color. Then, a photometry operation is performed by average reference spot photometry. For example, as shown in FIG. 9, even if the entire image is represented with a yellow color due to lighting, white balance adjustment is performed by correction of the color-temperature, and the photometry operation is performed by the average reference spot photometry to determine an exposure value.

Figure 9:
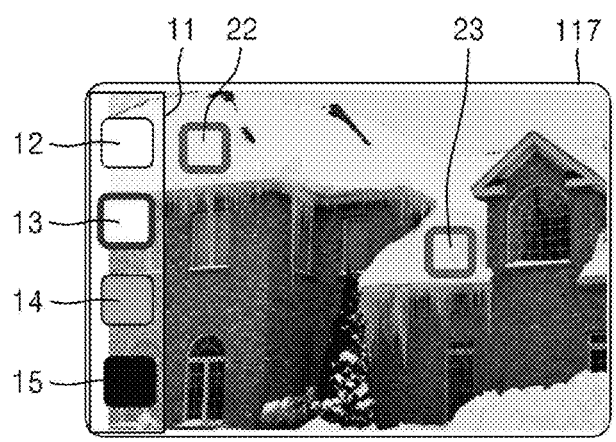
FIG. 9 is an image showing a method of controlling a digital photographing apparatus, according to another embodiment of the invention.
Figure 10:
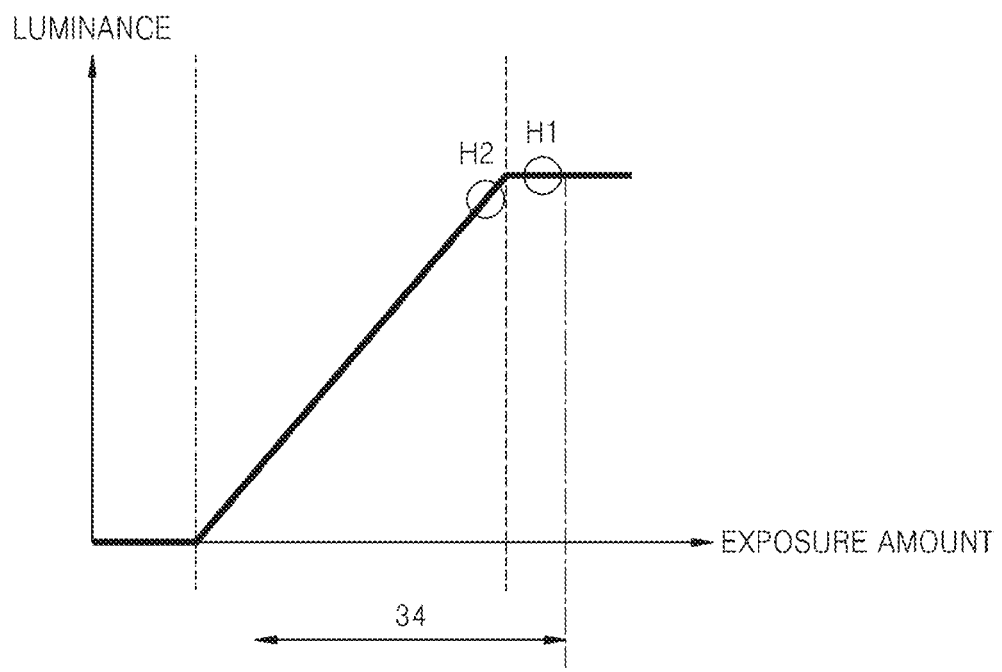
FIGS. 10 and 11 are graphs showing luminance distribution of images, according to other embodiment of the invention.
Figure 11:
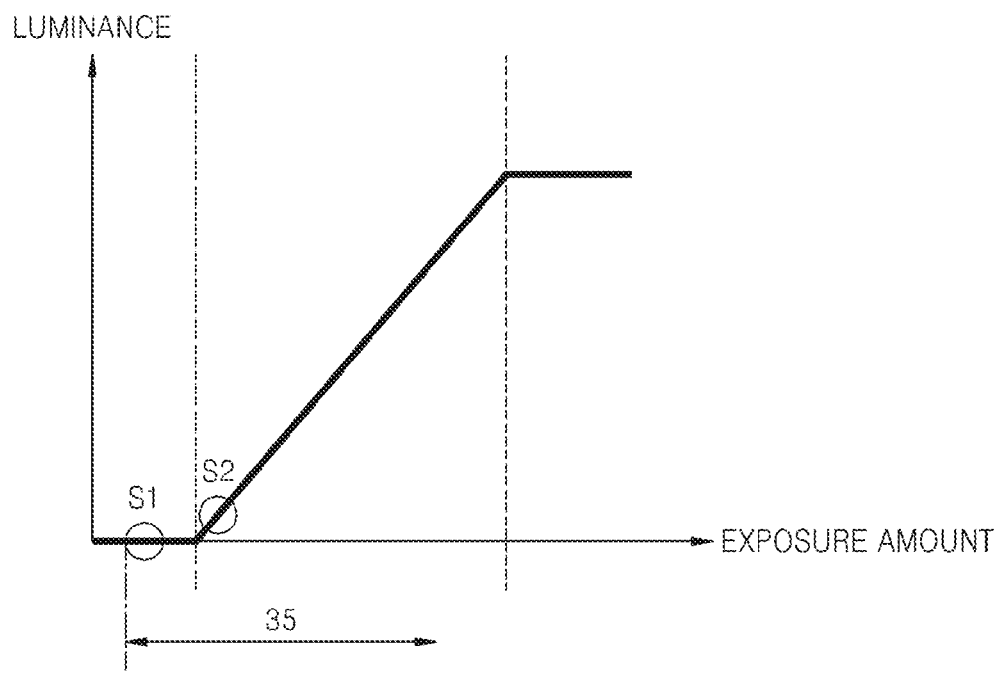

FIG. 9 is an image showing a method of controlling the digital photographing apparatus 1, according to another embodiment of the invention. FIGS. 10 and 11 are graphs showing luminance distribution of images, according to other embodiments of the invention.

FIG. 9 is an image showing a method of performing a photometry operation by using a highlight reference spot photometry calculation mode. In the highlight reference spot photometry calculation mode, a plurality of areas for the photometry operation may be set.

First, a user touches the highlight reference spot photometric icon 13, and thus highlight reference spot photometry is selected as a colorimetric reference. The user touches a touch panel to set first and second setting areas 22 and 23 on which the photometry operation is to be performed by the highlight reference spot photometry. When it is not clear which one of the first and second setting areas 22 and 23 has higher luminance, a plurality of areas are set as described above. Borders of the set areas may be represented by bold lines, similar to FIG. 2.

If the areas on which the photometry operation is to be performed are set, the photometry operation is performed on the set areas, and a maximum luminance area is determined through a predetermined operation. Then, a result of the photometry operation performed on the determined area is used as a reference value of a high luminance area in a luminance distribution. Then, a range of an exposure amount and an exposure value are determined by using the reference value. Here, the predetermined calculation refers to a calculation for detecting an area having a maximum luminance value from among results of measurement performed on the plurality of areas.

Referring to FIG. 10, luminance of the first setting area 22 is represented by a portion H1, and luminance of the second setting area 23 is represented by a portion H2. In the current embodiment, since the portion H1 has a higher value than the portion H2, the portion H1 is set to be a reference value of a high luminance area. Then, a range 34, which is a range of an exposure amount, is set. Thus, the luminance distribution is shifted within the range 34 in such a way that luminance is in a range of about 0 to about 255.

In the current embodiment, a method of setting a reference value of a high luminance area from a plurality of areas by highlight reference spot photometry and setting a range of an exposure amount and an exposure value has been described. Such a method of performing the photometry operation by the highlight reference spot photometry calculation mode may also be applied to the method of performing the photometry operation by the shadow reference spot photometry calculation mode in the same manner.

Similarly to FIG. 9, a user touches the shadow reference spot photometric icon 15 and touches a dark area of an image a plurality of times to set an area on which a photometry operation is to be performed. For example, as shown in FIG. 11, luminance of the set areas is represented by portions S1 and S2. Since the portion S1 has a lower luminance, the portion S1 is set to be a reference value of a low luminance area. Then, a range 35, which is a range of an exposure amount, is set. Thus, luminance distribution is shifted within the range 35 in such a way that luminance is in a range of about 0 to about 255.

Figure 12:
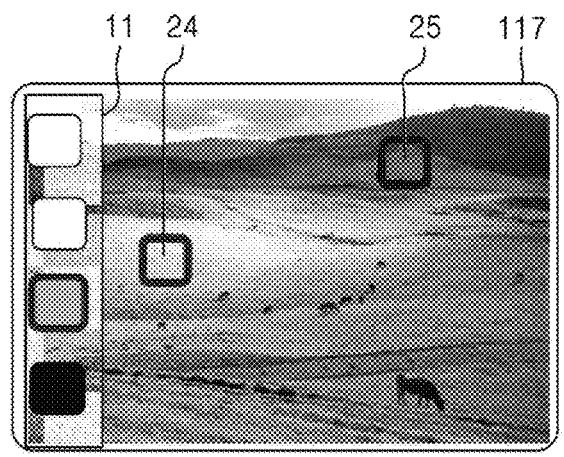
FIG. 12 is an image showing a method of controlling a digital photographing apparatus, according to another embodiment of the invention.
Figure 13:
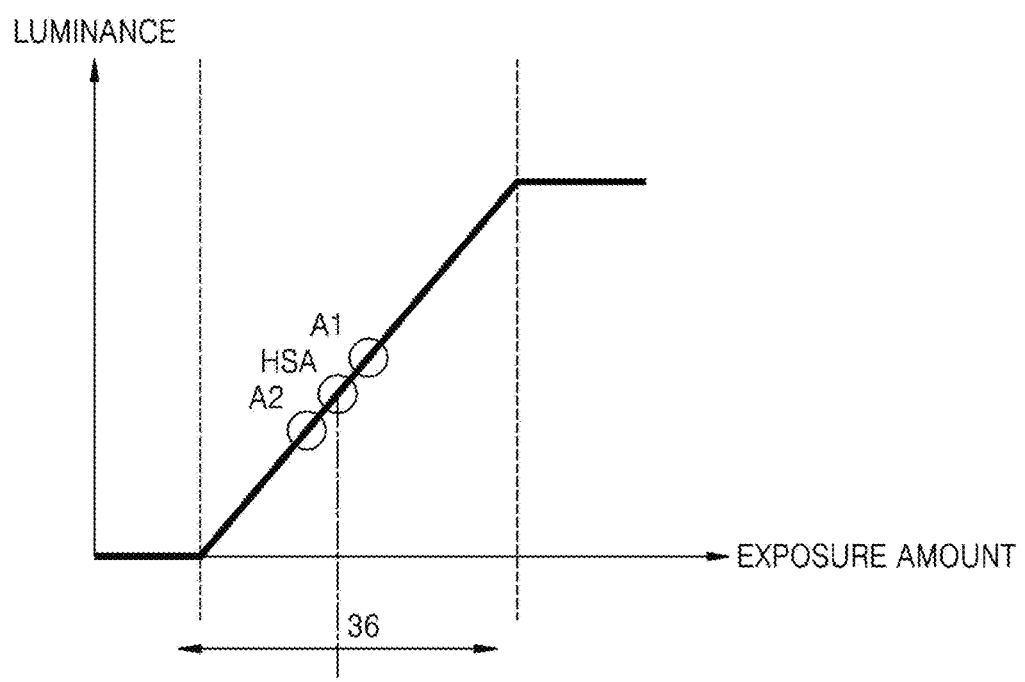
FIGS. 13 and 14 are graphs showing luminance distributions of images, according to other embodiments of the invention.

FIG. 12 is an image showing a method of controlling the digital photographing apparatus 1, according to another embodiment of the invention. FIG. 13 is a graph showing a luminance distribution of an image, according to another embodiment of the invention.

FIG. 12 is an image showing a method of performing a photometry operation by an average reference spot photometry calculation mode. In the average reference spot photometry calculation mode, a plurality of areas for the photometry operation may be set.

First, a user touches the average reference spot photometric icon 14, and thus average reference spot photometry is selected as a colorimetric reference. The user touches a touch panel to set first and second setting areas 24 and 25 on which the photometry operation is to be performed by the average reference spot photometry. When it is not clear which one of the first and second setting areas 24 and 25 is closer to average luminance, a plurality of areas are set as described above. Alternatively, when both the first and second setting areas 24 and 25 are to be used to obtain the average luminance, a plurality of areas are set as described above. The set areas may be represented by bold lines, similar to FIG. 2.

If the areas on which the photometry operation is to be performed are set, the photometry operation is performed on the set areas, and an average value of luminance of the set areas is calculated based on a result of the photometry operation. Then, the calculated average value is used as a reference value of the average luminance corresponding to a center of the luminance distribution. Then, a range of an exposure amount and an exposure value are determined by using the reference value.

Referring to FIG. 13, luminance of the first setting area 24 is represented by a portion A1, and luminance of the second setting area 25 is represented by a portion A2. An average value between the portion A1 and the portion A2 is represented by a portion HSA. Accordingly, luminance of the portion HSA is set to be a reference value of average luminance. Then, a range 36, which is a range of an exposure amount, is set. Thus, luminance distribution is shifted within the range 36 in such a way that the luminance is in a range of about 0 to about 255.

Figure 14:
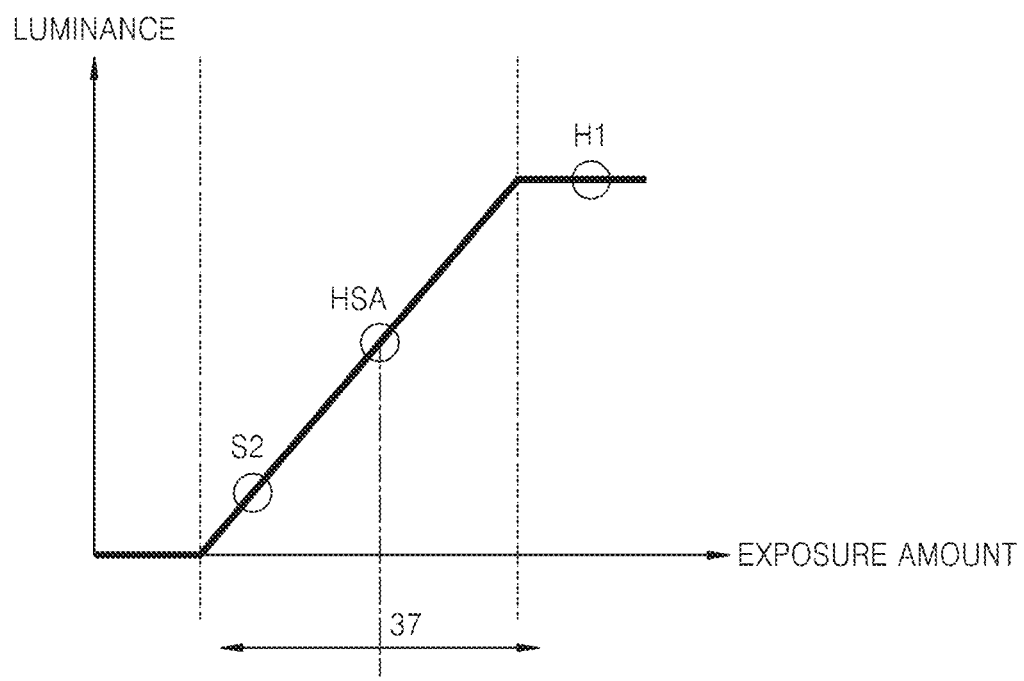

FIG. 14 is a graph showing luminance distribution of an image, according to another embodiment of the invention. FIG. 14 shows a case where a photometry operation is performed using both highlight reference spot photometry and shadow reference spot photometry. FIG. 14 may also be applied to a case where an image having high reproducibility is to be captured both in a high luminance area and a low luminance area or a case where average luminance between the high luminance area and the low luminance area is set to be an average photometric value.

A user sets a plurality of areas by touching the highlight reference spot photometric icon 13 and then selecting an area on which a photometry operation is to be performed, and also touching the shadow reference spot photometric icon 15 and then selecting an area on which a photometry operation is to be performed. An order of touching of the icons may be modified.

Referring to FIG. 14, a portion H1 represents luminance of an area on which a photometry operation is to be performed by highlight reference spot photometry, and a portion S2 represents luminance of an area on which a photometry operation is to be performed by shadow reference spot photometry. An average value between the portion H1 and the portion S2 is represented by a portion HSA. Accordingly, luminance of the portion HSA is set to be a reference value of an average luminance. Then, a range 37, which is a range of an exposure amount, is set, and thus luminance distribution is shifted within the range 37 in such a way that luminance is in a range of about 0 to about 255.

In the above embodiments, cases where a touch panel is used to perform photometry and colorimetry operations by a spot AE mode and a spot AWB mode have been described. However, these are just examples, and the invention is not limited thereto. The photometry and colorimetry operations may also be performed by using, for example, a direction button that serves as the position setting manipulation key of the manipulation unit 126.

Figure 15A:
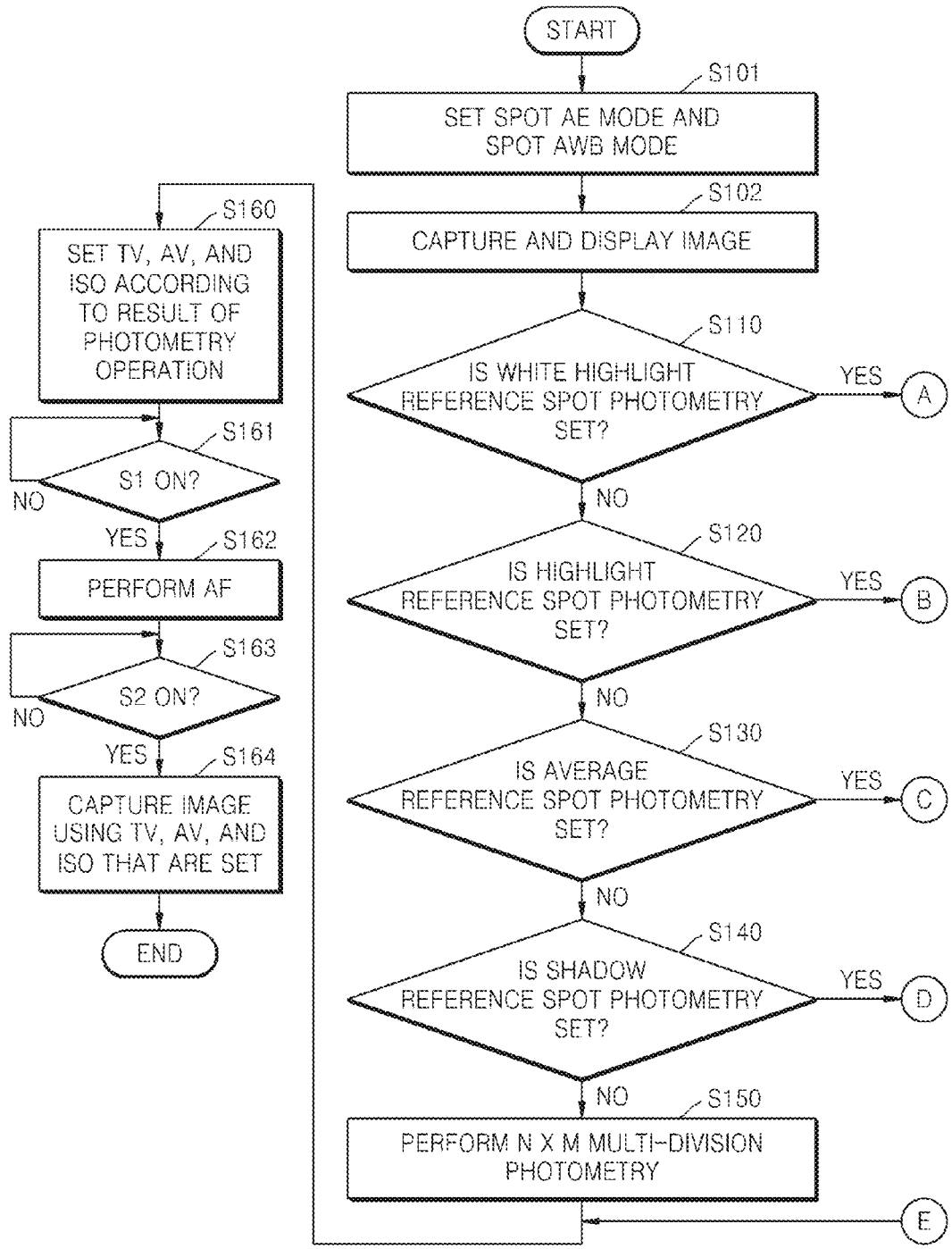

FIGS. 15A and 15B are flowcharts showing a method of controlling the digital photographing apparatus 1, according to an embodiment of the invention.

Referring to FIGS. 15A and 15B, if a power switch is turned on by a user, the digital photographing apparatus 1 starts to operate. Then, a spot AE mode and a spot AWB mode are set by the user (Operation S101). At the same time as when the digital photographing apparatus 1 executes the spot AE mode and the spot AWB mode, the digital photographing apparatus 1 captures an image and displays the image on the display unit 117 (Operation S102).

It is determined whether white highlight reference spot photometry is set as a colorimetric reference by the user (Operation S110). If the white highlight reference spot photometry is set, the method proceeds to Operation S111. Then, it is determined whether an area where a photometry operation is to be performed is set by the user (Operation S111). If the area is set, the photometry operation and a colorimetry operation are performed on the set area (Operation S112). As a result of the colorimetry operation, if a color-temperature of the set area is 2000K, the set area is shifted in such a way that the color-temperature of the set area is 5500K, thereby shifting white balance of the entire image (Operation S113). A photometric value is set to be a reference value having luminance that is higher by 2.3 EV with respect to level 118/255 which is an average reference value (Operation S114). That is, a reference value of a high luminance area is set to be, for example, 225/255. Here, the above-described numerical value may be set according to a gamma characteristic that is determined for the digital photographing apparatus 1. Then, the method proceeds to Operation S160. Here, although not shown in the drawings, a live-view image displayed on the display unit 117 may be an image to which white balance adjustment due to correction of the color-temperature is reflected.

If the white highlight reference spot photometry is not set in Operation S110, it is determined whether highlight reference spot photometry is set (Operation S120). If the highlight reference spot photometry is set, the method proceeds to Operation S121. Then, it is determined whether an area on which a photometry operation is to be performed is set by the user (Operation S121). If the area is set, the photometry operation is performed on the set area (Operation S122). Here, the colorimetry operation is performed on the entire area. Then, the photometric value is set to be a reference value having luminance that is higher by 2.3 EV with respect to level 118/255 which is an average reference value (Operation S123). That is, the photometric value is set to be a reference value of a high luminance area. Then, the method proceeds to Operation S160.

If the highlight reference spot photometry is not set in Operation S120, it is determined whether an average reference spot photometry is set (Operation S130). If the average reference spot photometry is set, the method proceeds to Operation S131. Then, it is determined whether an area where the photometry operation is to be performed is set by the user (Operation S131). If the area is set, the photometry operation is performed on the set area (Operation S133). Here, the colorimetry operation is performed on the entire area. Then, the photometric value is set to be level 118/255 (Operation S133). That is, the photometric value is set to be a reference value of average luminance corresponding to a center of luminance distribution. Then, the method proceeds to Operation S160.

If the average reference spot photometry is not set in Operation S130, it is determined whether a shadow reference spot photometry is set (Operation S140). If the shadow reference spot photometry is set, the method proceeds to Operation S141. Then, it is determined whether an area on which a photometry operation is to be performed by the user (Operation S141). If the area is set, the photometry operation is performed on the set area (Operation S142). Here, the colorimetry operation is performed on the entire area. Then, the photometric value is set to be a reference value having luminance that is lower by 2.7 EV with respect to level 118/255 which is an average reference value (Operation S143). That is, the photometric value is set to be a reference value of a low luminance area, for example, to be level 7/255. Then, the method proceeds to Operation S160.

Meanwhile, when no colorimetric reference is set, n×m multi-division photometry is performed (Operation S150). For example, multi-photometry may be performed on a total of 221 areas of 17 squares downward by 13 across. In the current embodiment, although it has been exemplified that the multi-photometry is performed, this is just an example, and the invention is not limited thereto. When no colorimetric reference is set, a photometry operation may be performed using any one of various conventional photometry methods, for example, a center focus photometry mode or an average photometry mode.

If the photometry operation is finished, a shutter speed (TV), an aperture value (AV), a sensitivity (ISO), etc. are set according to a result of the photometry operation, and the set values are displayed on the display unit 117 (Operation S160). Then, half-pressing (S1 ON) of a shutter is on standby to be performed by a user (S161). If the half-pressing (S1 ON) of the shutter is performed by the user, auto-focusing (AF) is performed (Operation S162).

Meanwhile, at the time when the half-pressing (S1 ON) of the shutter is performed, a spot photometry operation may also be performed. That is, the operations S110 to S160 that were performed before the half-pressing (S1 ON) of the shutter may be performed after the operation S162, that is, when AF is locked in a focal position. In this case, a spot AE mode and a spot AWB mode may be performed under conditions similar to those of a real photographing.

Then, full-pressing (S2 ON) of a shutter that is on standby is to be performed by a user (Operation S163). If the full-pressing (S2 ON) of the shutter is performed, an image is captured using the shutter speed, the aperture value, and the sensitivity that are previously set (Operation S164).

Then, the photographing operation is finished according to the above-described method.

Figure 16:
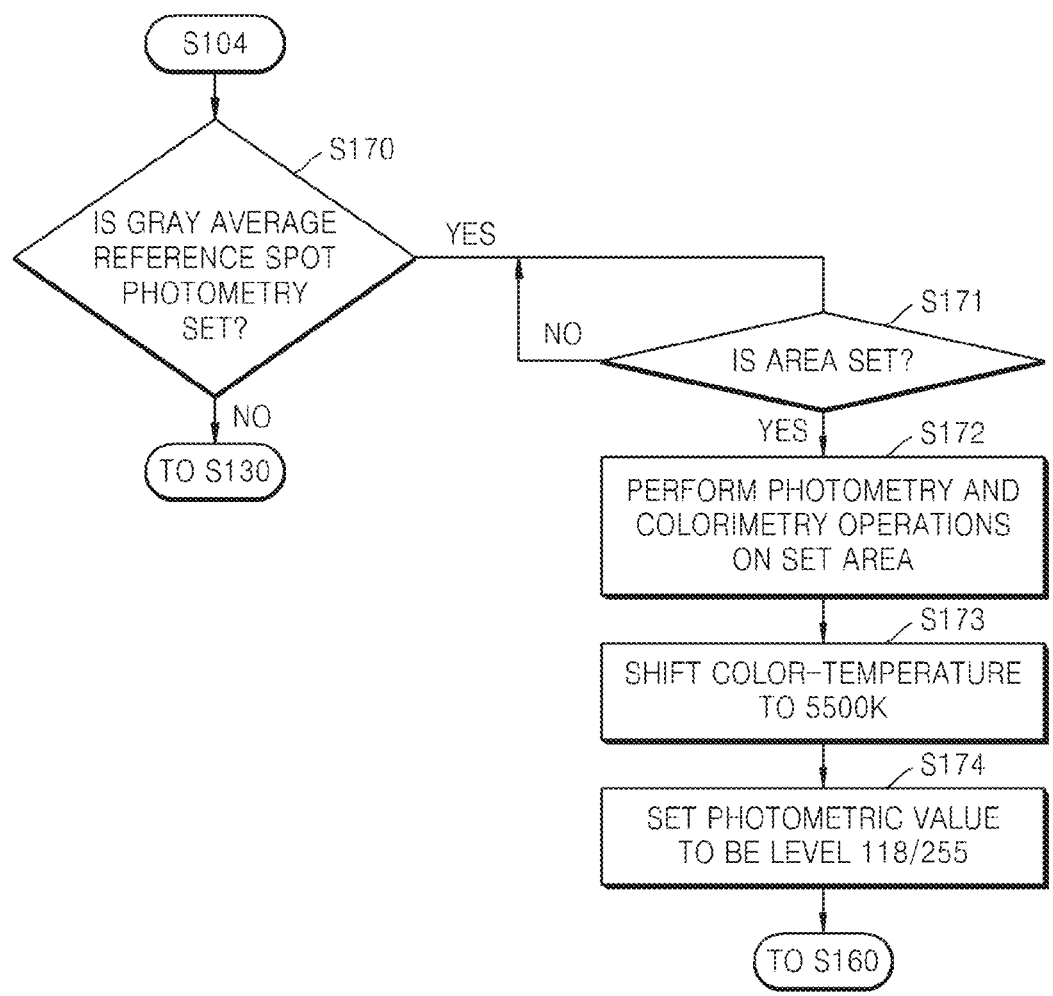
FIG. 16 is a flowchart showing a method of controlling a digital photographing apparatus, according to another embodiment of the invention.

FIG. 16 is a flowchart showing a method of controlling the digital photographing apparatus 1, according to another embodiment of the invention. The method shown in FIG. 16 is a combination of the method shown in FIGS. 15A and 15B and the method shown in FIG. 8.

Referring to FIG. 16, if the highlight reference spot photometry is not set in Operation S120, it is determined whether gray average reference spot photometry is set (Operation S170). If the gray average reference spot photometry is set, the method proceeds to S171. Then, it is determined whether an area on which a photometry operation is to be performed by the user (Operation S171). If the area is set, the photometry operation and a colorimetry operation are performed on the set area (Operation S172).

As a result of the colorimetry operation, if a color-temperature of the set area is 2000K, the set area is shifted in such a way that the color-temperature of the set area is 5500K, thereby shifting white balance of the entire image (Operation S173). A photometric value is set to be level 118/255 (Operation S174). Then, the method proceeds to Operation S160.

Meanwhile, if the gray average reference spot photometry is not set in Operation S170, the method proceeds to S130.

Figure 17A:
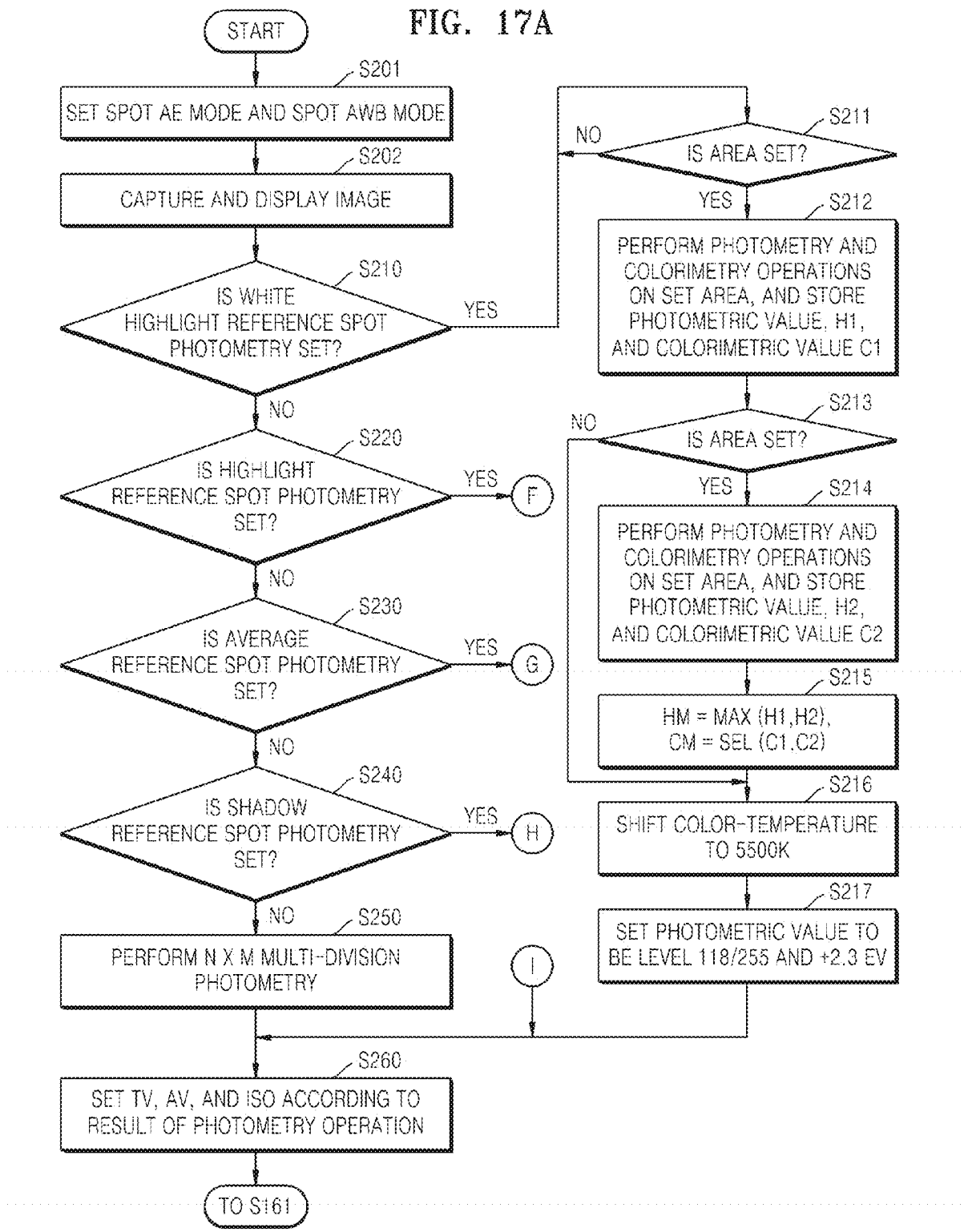
FIGS. 17A and 17B are flowcharts showing a method of controlling a digital photographing apparatus, according to another embodiment of the invention.
Figure 17B:
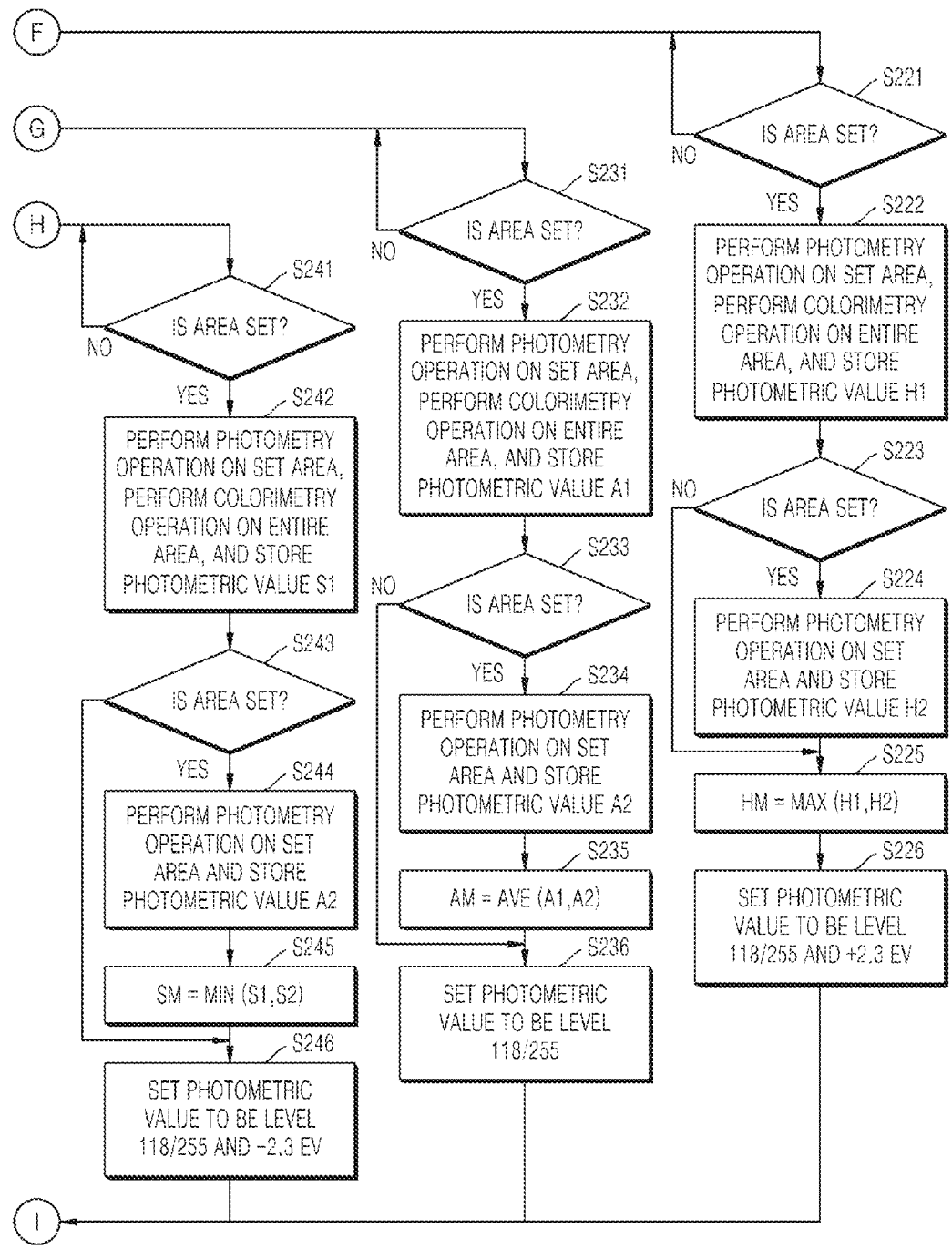

FIGS. 17A and 17B are flowcharts showing a method of controlling the digital photographing apparatus 1, according to another embodiment of the invention. FIGS. 17A and 17B show a case where a plurality of areas are set.

Referring to FIGS. 17A and 17B, if a power switch is turned on by a user, the digital photographing apparatus 1 starts to operate. Then, a spot AE mode and a spot AWB mode are set by the user (Operation S201). At the same time as when the digital photographing apparatus 1 executes the spot AE mode and the spot AWB mode, the digital photographing apparatus 1 captures an image and displays the image on the display unit 117 (Operation S202).

It is determined whether white highlight reference spot photometry is set as a colorimetric reference by the user (Operation S210). If the white highlight reference spot photometry is set, the method proceeds to Operation S211. Then, it is determined whether a first area where a photometry operation is to be performed is set by the user (Operation S211). If the first area is set, the photometry operation and a colorimetry operation are performed on the set area, and a photometric value H1 and a colorimetric value C1 are stored as values that are obtained as results of the photometry operation and the colorimetry operation, respectively (Operation S212).

It is determined whether a second area is set by the user (Operation S213). If the second area is set, photometry and colorimetry operations are performed on the second area. Then, a photometric value H2 and a colorimetric value C2 are stored as values that are obtained as results of the photometry operation and the colorimetry operation, respectively (Operation S214).

From among the stored photometric values H1 and H2, a photometric value HM which is relatively great is obtained by an operation HM=MAX(H1,H2). Then, a colorimetric value CM, which is measured in an area selected from the photometric values H1 and H2, is obtained by an operation CM=SEL(C1,C2). For example, if it is determined that the photometric value H1 is relatively greater than the photometric value H2, the colorimetric value C1 is selected, or if it is determined that the photometric value H2 is relatively greater than the photometric value H1, the colorimetric value C2 is selected.

A color-temperature is shifted to 5500K based on the selected colorimetric value (the colorimetric value C1 of Operation S212 or the colorimetric value CM of Operation S215) (Operation S216), and a result of white balance is reflected to the entire area to display an image. Then, the selected photometric value is set to be a reference value having luminance that is higher by 2.3 EV with respect to level 118/255 which is an average reference value (Operation S217). That is, the selected photometric value is set to be a reference value of a high luminance area. Then, the method proceeds to Operation S260.

Meanwhile, if the second area is not set in Operation S213, the method proceeds to Operation S216, and the color-temperature is shifted and a colorimetric reference value is set using the photometric value H1 and the colorimetric value C1.

If the white highlight reference spot photometry is not set in Operation S210, it is determined whether the highlight reference spot photometry is set (Operation S220). If the highlight reference spot photometry is set, the method proceeds to Operation S221. Then, it is determined whether the first area on which the photometry operation is to be performed is set by a user (Operation S221). If the first area is set, a photometry operation is performed on the first area, and then the photometric value H1 is stored as a value obtained as a result of the photometry operation (Operation S222). Here, a colorimetry operation is performed on the entire area. That is, a process of shifting the color-temperature to 5500K is not performed, and a general white balance process is performed.

It is determined whether the second area is set by a user (Operation S223). If the second area is set, a photometry operation is performed on the second area. Then, the photometric value H2 is stored as a value obtained as a result of the photometry operation (Operation S224).

From among the stored photometric values H1 and H2, a photometric value HM which is relatively great is obtained by an operation HM=MAX(H1,H2). The obtained photometric value is set to be a reference value having luminance that is higher by 2.3 EV with respect to level 118/255 which is an average reference value (Operation S226). That is, the photometric value is set to be a reference value of a high luminance area. Then, the method proceeds to Operation S260.

Meanwhile, if a new area is not set in S223, the method proceeds to S225 to set the colorimetric reference value using the photometric value H1.

If the highlight reference spot photometry is not set in S220, it is determined whether the average reference spot photometry is set (Operation S230). If the average reference spot photometry is set, the method proceeds to Operation S231. Then, it is determined whether the first area on which a photometry operation is to be performed is set by a user (Operation S231). If the first area is set, the photometry operation is performed on the first area, and then a photometric value A1 is stored as a value obtained as a result of the photometry operation (Operation S232). Here, a colorimetry operation is performed on the entire area of an image, and a general white balance process is performed.

It is determined whether the second area is set by a user (Operation S233). If the second area is set, a photometry operation is performed on the second area. Then, a photometric value A2 is stored as a value obtained as a result of the photometric operation (Operation S234).

An average value between the stored photometric values A1 and A2 is obtained. Here, the average value between the stored photometric values A1 and A2 is obtained by an operation AM=AVE(A1,A2). The obtained average value is set to level 118/255 which is an average reference value (Operation S236). That is, the obtained average value is set to be a reference value of average luminance corresponding to a center of luminance distribution. Then, the method proceeds to Operation S260.

Meanwhile, if the new area is not set in S233, the method proceeds to Operation S236. Then, the colorimetric reference value is set using the photometric value A1.

If the average reference spot photometry is not set in Operation S230, it is determined whether the shadow reference spot photometry is set (Operation S240). If the shadow reference spot photometry is set, the method proceeds to S241. Then, it is determined whether the first area on which a photometry operation is to be performed is set by a user (Operation S241). If the first area is set, the photometry operation is performed on the first area, and a photometric value S1 is stored as a value obtained as a result of the photometry operation (Operation S242). Here, a colorimetry operation is performed on the entire area of an image, and a general white balance process is performed.

It is determined whether the second area is set by a user (Operation S243). If the second area is set, a photometry operation is performed on the second area. Then, a photometric value S2 is stored as a value obtained as a result of the photometric operation (Operation S244).

A relatively small value from among the stored photometric values S1 and S2 is detected. That is, here, a value, which is small relative to the stored photometric values S1 and S2 and thus has a relatively low luminance, is extracted. The detected photometric value is set to be a reference value having luminance that is lower by 2.7 EV with respect to level 118/255 which is an average reference value (Operation S226). That is, the photometric value is set to be a reference value of a low luminance area. Then, the method proceeds to S260.

Meanwhile, if the new area is not set in Operation S243, the method proceeds to Operation S246 to set the reference value using the photometric value S1.

If no colorimetric reference is set in Operations S210 to S240, n×m multi-division photometry is performed (Operation S250). Then, a shutter speed, an aperture value, and a sensitivity are set (Operation S260). The subsequent operations are the same as the operations performed in FIG. 15A, and thus a detailed description will be omitted here.

Then, the photographing operation is finished according to the above-described method.

In FIGS. 15A to 17B, it is determined whether a plurality of photometric references are set according to a specific order. However, this is just an example, and the invention is not limited thereto. For example, first of all, it may be determined whether average reference spot photometry is set, and at the end, it may be determined whether white highlight reference spot photometry is set. Alternatively, it may be determined at any particular time what photometric reference is set.

Also, in FIGS. 17A and 17B, although it has been described that a photometry operation is performed by setting two areas, the invention is not limited thereto. For example, three or more areas may be set, and a photometry operation may be performed on the set areas.

Also, in the embodiments of the invention, luminance information of 8 bits is represented, and average luminance of level 118/255 is represented, but the invention is not limited thereto. For example, luminance information of 16 bits may be represented, and the average luminance may be set within a range of 30208/65535)±10%.

In addition, in the highlight reference spot photometry, the high luminance area is set to be +2.3EV based on the average luminance, but the high luminance area may be set to be any value in a range from about +1 EV to about +3 EV according to a gamma setting of the digital photographing apparatus 1. Similarly, in the shadow reference spot photometry, the low luminance area is set to be −2.7 EV based on the average luminance, but the low luminance area may be set to be any value in a range from about −3 EV to about −1 EV according to a gamma setting of the digital photographing apparatus 1.

Meanwhile, in the flowcharts shown in FIGS. 15A to 17B, a position of an object is set by a touch panel, but the invention is not limited thereto. That is, the position of the object may be set on an image to be displayed by using a joystick, a direction manipulation key, or the like.

As described above, according to the digital photographing apparatus 1 of the embodiments of the invention, a high quality image may be captured by properly adjusting exposure and white balance.

The particular embodiments shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The particular embodiments may be described in terms of functional block components and various processing steps. Such functional blocks may be realized by any number of hardware and/or software components configured to perform the specified functions. For example, the embodiments of the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembly language, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A digital photographing apparatus comprising:
   a display unit for displaying a captured image;
   a position setting unit for setting a position on the display unit;
   an area setting unit for setting an area based on the position set by the position setting unit;
   a photometry unit for measuring luminance of the set area; and
   an exposure value determination unit for determining an exposure value based on i) a photometric reference, which allows a value obtained as a result of measuring the luminance of the set area to be a reference value of a high luminance area of luminance distribution according to an exposure amount of an image, and ii) a result of the measuring performed by the photometry unit;
   wherein when a reference reflectivity is 18%, which is an average reflectivity of a general object, and when luminance of the average reflectivity is set to be in a range of 115/255 to 128/255, which is a range of luminance according to the luminance distribution, the reference value is set to be in a range of 190/255 to 255/255 of the luminance distribution.

2. The digital photographing apparatus of claim 1, wherein the position setting unit is at least one of a touch panel and a position setting manipulation key.

3. The digital photographing apparatus of claim 1, wherein a plurality of positions may be set, the area setting unit sets a plurality of areas based on the set positions, and the exposure value determination unit performs a photometry operation from results of measurement with respect to the plurality of areas and determines the exposure value based on a value obtained as a result of the photometry operation and the photometric reference.

4. The digital photographing apparatus of claim 1 further comprising:
a colorimetric unit for measuring a color of the set area;
a colorimetric reference selection unit for providing a colorimetric reference menu and receiving a selection from a group comprising:
a first colorimetric reference, which allows a color-temperature of the set area to be a white reference value in daylight; and
a second colorimetric reference, which allows a color-temperature of the set area to be a gray reference value that is set based on the white reference value in daylight; and
a color-temperature adjusting unit for adjusting a color-temperature of an image based on the selected colorimetric reference and a result of the measuring performed by the colorimetric unit.

5. The digital photographing apparatus of claim 4, wherein the color-temperature of the white reference value in daylight is set to be in a range of about 5000K to about 6500K.

6. The digital photographing apparatus of claim 4, wherein the photometric reference is a photometric reference, which allows the value obtained as a result of the photometry operation to be a reference value of a high luminance area of luminance distribution according to an exposure amount of an image, and the colorimetric reference is the first colorimetric reference.

7. A digital photographing apparatus comprising:
a display unit for displaying a captured image;
a position setting unit for setting a position on the display unit;
an area setting unit for setting an area based on the position set by the position setting unit;
a photometry unit for measuring luminance of the set area;
a photometric reference selection unit for providing a photometric reference menu and receiving a selection from:
a first photometric reference based upon a reference value of a high luminance area of luminance distribution according to an exposure amount of an image, the first photometric reference value is in a range of 190/255 to 255/255 of the luminance distribution when a reference reflectivity is 18%, which is an average reflectivity of a general object;
a second photometric reference based upon a reference value of average luminance corresponding to a center of luminance distribution according to an exposure amount of an image, the second photometric reference value is in a range of 115/255 to 128/255 of the luminance distribution when a reference reflectivity is 18%, which is an average reflectivity of a general object; and
a third photometric reference based upon a reference value of a low luminance area of luminance distribution according to an exposure amount of an image, the third photometric reference value is in a range of 0/255 to 50/255 when a reference reflectivity is 18%, which is an average reflectivity of a general object;
an exposure value determination unit for determining an exposure value based on i) the selected photometric reference, which allows a value obtained as a result of measuring the luminance of the set area to be a reference value of the selected photometric reference, and ii) a result of the measuring performed by the photometry unit,
wherein a plurality of positions may be set, the area setting unit sets a plurality of areas based on the set positions, and the exposure value determination unit performs a photometry operation from results of measurement with respect to the plurality of areas and determines the exposure value based on a value obtained as a result of the photometry operation and the photometric reference.

8. The digital photographing apparatus of claim 7, wherein the photometry operation is a calculation for extracting a maximum value from the results of measurement, and the photometric reference is the first photometric reference.

9. The digital photographing apparatus of claim 7, wherein the photometry operation is an operation for extracting an average value of the results of measurement, and the photometric reference is the second photometric reference.

10. The digital photographing apparatus of claim 7, wherein the photometry operation is an operation for extracting a minimum value from the results of measurement, and the photometric reference is the third photometric reference.

11. The digital photographing apparatus of claim 7, wherein in at least one area of the set areas, a first photometric value, which is a reference value of a high luminance area of luminance distribution according to an exposure amount of an image, is obtained as a result of the photometry operation; and in another area, a third photometric value, which is a reference value of a low luminance area of the of luminance distribution, is obtained as a result of the photometry operation, and wherein the photometry operation is a calculation for setting an average value between the first photometric value and the third photometric value as an average colorimetric reference value.

12. A digital photographing apparatus comprising:
a display unit for displaying a captured image;
a position setting unit for setting a position on the display unit;
an area setting unit for setting an area based on the position set by the position setting unit;
a photometry unit for measuring luminance of the set area; and
an exposure value determination unit for determining an exposure value based on i) a second photometric reference, which allows a value obtained as a result of measuring the luminance of the set area to be a reference value of an average luminance area of luminance distribution according to an exposure amount of an image, and ii) a result of the measuring performed by the photometry unit;
wherein when a reference reflectivity is 18%, which is an average reflectivity of a general object, the reference value is set to be in a range of 115/255 to 128/255 of the luminance distribution.

13. The digital photographing apparatus of claim 12 further comprising:
a colorimetric unit for measuring a color of the set area;

a colorimetric reference selection unit for providing a colorimetric reference menu and receiving a selection from a group comprising:
- a first colorimetric reference, which allows a color-temperature of the set area to be a white reference value in daylight; and
- a second colorimetric reference, which allows a color-temperature of the set area to be a gray reference value that is set based on the white reference value in daylight; and a color-temperature adjusting unit for adjusting a color-temperature of an image based on the selected colorimetric reference and a result of the measuring performed by the colorimetric unit.

14. The digital photographing apparatus of claim 13, wherein the photometric reference is a photometric reference, which allows the value obtained as a result of the photometry operation to be a reference value of a high luminance area of luminance distribution according to an exposure amount of an image, and the colorimetric reference is the first colorimetric reference.

15. The digital photographing apparatus of claim 13, wherein the color-temperature of the white reference value in daylight is set to be in a range of about 5000K to about 6500K.

16. A digital photographing apparatus comprising:
- a display unit for displaying a captured image;
- a position setting unit for setting a position on the display unit;
- an area setting unit for setting an area based on the position set by the position setting unit;
- a photometry unit for measuring luminance of the set area; and
- an exposure value determination unit for determining an exposure value based on i) a third photometric reference, which allows a value obtained as a result of measuring the luminance of the set area to be a reference value of a low luminance area of luminance distribution according to an exposure amount of an image, and ii) a result of the measuring performed by the photometry unit;

wherein when a reference reflectivity is 18%, which is an average reflectivity of a general object, and when luminance of the average reflectivity is set to be in a range of 115/255 to 128/255, which is a range of luminance according to the luminance distribution, the reference value is set to be in a range of 0/255 to 50/255 of the luminance distribution.

17. The digital photographing apparatus of claim 16 further comprising:
- a colorimetric unit for measuring a color of the set area;
- a colorimetric reference selection unit for providing a colorimetric reference menu and receiving a selection from a group comprising:
  - a first colorimetric reference, which allows a color-temperature of the set area to be a white reference value in daylight; and
  - a second colorimetric reference, which allows a color-temperature of the set area to be a gray reference value that is set based on the white reference value in daylight; and
- a color-temperature adjusting unit for adjusting a color-temperature of an image based on the selected colorimetric reference and a result of the measuring performed by the colorimetric unit.

18. The digital photographing apparatus of claim 17, wherein the photometric reference is a photometric reference, which allows the value obtained as a result of the photometry operation to be a reference value of a high luminance area of luminance distribution according to an exposure amount of an image, and the colorimetric reference is the first colorimetric reference.

19. The digital photographing apparatus of claim 17, wherein the color-temperature of the white reference value in daylight is set to be in a range of about 5000K to about 6500K.

* * * * *